(12) United States Patent
Zhang

(10) Patent No.: US 9,380,127 B2
(45) Date of Patent: Jun. 28, 2016

(54) DISTRIBUTED CACHING AND CACHE ANALYSIS

(75) Inventor: Liang Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 906 days.

(21) Appl. No.: 13/517,932

(22) PCT Filed: May 16, 2012

(86) PCT No.: PCT/US2012/038145
§ 371 (c)(1),
(2), (4) Date: Jun. 20, 2012

(87) PCT Pub. No.: WO2012/158804
PCT Pub. Date: Nov. 22, 2012

(65) Prior Publication Data
US 2012/0297010 A1    Nov. 22, 2012

(30) Foreign Application Priority Data
May 18, 2011 (CN) .......................... 2011 1 0129060

(51) Int. Cl.
*G06F 15/167* (2006.01)
*H04L 29/08* (2006.01)
(52) U.S. Cl.
CPC .......... *H04L 67/288* (2013.01); *H04L 67/2842* (2013.01)
(58) Field of Classification Search
CPC ..................... H04L 67/288; H04L 67/2842
USPC .................................. 709/213–216, 201, 203
See application file for complete search history.

(56) References Cited

U.S. PATENT DOCUMENTS

| 6,871,268 B2 | 3/2005 | Iyengar et al. |
| 6,973,546 B2 | 12/2005 | Johnson |
| 7,103,616 B1 | 9/2006 | Harmer et al. |
| 7,143,143 B1 | 11/2006 | Thompson |
| 7,254,617 B2 * | 8/2007 | Schuh ............... G06F 17/30902 707/E17.12 |
| 7,818,600 B2 | 10/2010 | Fricano et al. |
| 7,853,688 B2 | 12/2010 | Burckart et al. |
| 7,937,477 B1 | 5/2011 | Day et al. |

(Continued)

FOREIGN PATENT DOCUMENTS

| CN | 101764824 | 6/2010 |
| CN | 101867607 | 10/2010 |

OTHER PUBLICATIONS

The PCT Seach Report mailed Jul. 17, 2012 for PCT application No. PCT/US12/38145, 7 pages.

(Continued)

*Primary Examiner* — Kenneth R Coulter
(74) *Attorney, Agent, or Firm* — Lee & Hayes, PLLC

(57) ABSTRACT

In a distributed caching system, a Web server may receive, from a user device, a request for a Web service. The Web server may parse the request to identify a cookie included in the request and determine whether the cookie includes allocation information. The allocation information may indicate multiple cache servers temporally store certain data associated with the Web service. The Web server may request for the certain data from the cache servers and then transmit the certain data to the user device. If one of the cache servers fails to respond to the request, the Web server may reallocate the cached data and update the cookie by overwriting the allocation information stored in the cookie.

20 Claims, 4 Drawing Sheets

(56) References Cited

U.S. PATENT DOCUMENTS

| | | | |
|---|---|---|---|
| 7,987,239 B2 * | 7/2011 | Agarwalla et al. | 709/217 |
| 8,046,539 B2 | 10/2011 | George et al. | |
| 8,429,630 B2 * | 4/2013 | Nickolov | G06F 9/4856 717/110 |
| 8,799,409 B2 * | 8/2014 | Kasten et al. | 709/219 |
| 2001/0043600 A1 | 11/2001 | Chatterjee et al. | |
| 2003/0110296 A1 | 6/2003 | Kirsch et al. | |
| 2003/0191812 A1 | 10/2003 | Agarwalla et al. | |
| 2004/0111486 A1 * | 6/2004 | Schuh | G06F 17/30902 709/214 |
| 2005/0261985 A1 | 11/2005 | Miller et al. | |
| 2006/0106807 A1 | 5/2006 | DeVitis et al. | |
| 2008/0005273 A1 * | 1/2008 | Agarwalla et al. | 709/217 |
| 2008/0189383 A1 * | 8/2008 | Schuh | G06F 17/30902 709/214 |
| 2009/0276771 A1 * | 11/2009 | Nickolov | G06F 9/4856 717/177 |
| 2010/0180208 A1 | 7/2010 | Kasten et al. | |
| 2010/0318584 A1 | 12/2010 | Krishnaprasad et al. | |
| 2011/0082908 A1 | 4/2011 | Ban | |
| 2011/0138102 A1 | 6/2011 | Glikson et al. | |

OTHER PUBLICATIONS

The Extended European Search Report mailed Oct. 15, 2014 for European Patent Application No. 12786633.3, 8 pages.

Translation of Chinese office action from corresponding Chinese patent application No. 201110129060.X, dated Jun. 23, 2014, pp. 1-5, 9 pages.

Translation of Chinese search report from corresponding Chinese patent application No. 201110129060.X, dated Jun. 9, 2014, pp. 1-2, 2 pages.

Translation of Chinese office action from corresponding Chinese patent application No. 201110129060.X, dated Aug. 5, 2015, 8 pages.

Translation of Chinese office action from corresponding Chinese patent application No. 201110129060.X, dated Feb. 7, 2015, pp. 3-7, 9 pages.

* cited by examiner

DISTRIBUTED CACHING AND CACHE ANALYSIS

CROSS REFERENCE TO RELATED PATENT APPLICATIONS

This application is a national stage application of an international patent application PCT/US12/38145, filed May 16, 2012, which claims priority to Chinese Patent Application No. 201110129060.X, filed on May 18, 2011, entitled "Distributed Caching Method and System, Cache Analysis Method and Analysis System," which applications are hereby incorporated by reference in their entirety.

TECHNICAL FIELD

This disclosure relates to the field of computer caching technology. Specifically, this disclosure relates to a distributed caching method and system.

BACKGROUND

In response to queries of Web applications, Web servers typically temporarily store cached data (e.g., copies of Web documents associated with popular information) in temporary storage. In general, multiple cache servers are utilized to store the cached data to increase storage capacities and to secure data integrity. However, certain changes to these cache servers may present problems for using the cached data. For example, adding a new cache server or removing a cache server from the multiple cache servers may cause mismatching between the cached data and the multiple cache servers. This mismatch may, for example, increase the Web servers' response time to the queries.

SUMMARY

A Web server receives, from a user device, a request for data associated with a Web service. After receiving the data, the Web server may allocate a portion or all of the data to multiple cache servers. The corresponding allocation information may be recorded in a cookie, which is then stored in the user device. In response to another request from the user device, the Web server may parse the other request to identify the allocation information stored in the cookie and facilitate transmission of the requested data to the user device based on the allocation information.

In some aspects, the Web server may determine that a cache server of the cache servers fails to respond to a request in a predetermined time period. The Web server may allocate data cached by the cache server to one or more cache servers of the cache servers. The Web server may then update the cookie by overwriting the allocation information.

BRIEF DESCRIPTION OF THE DRAWINGS

The Detailed Description is described with reference to the accompanying figures. The use of the same reference numbers in different figures indicates similar or identical items.

DETAILED DESCRIPTION

Figure 1:
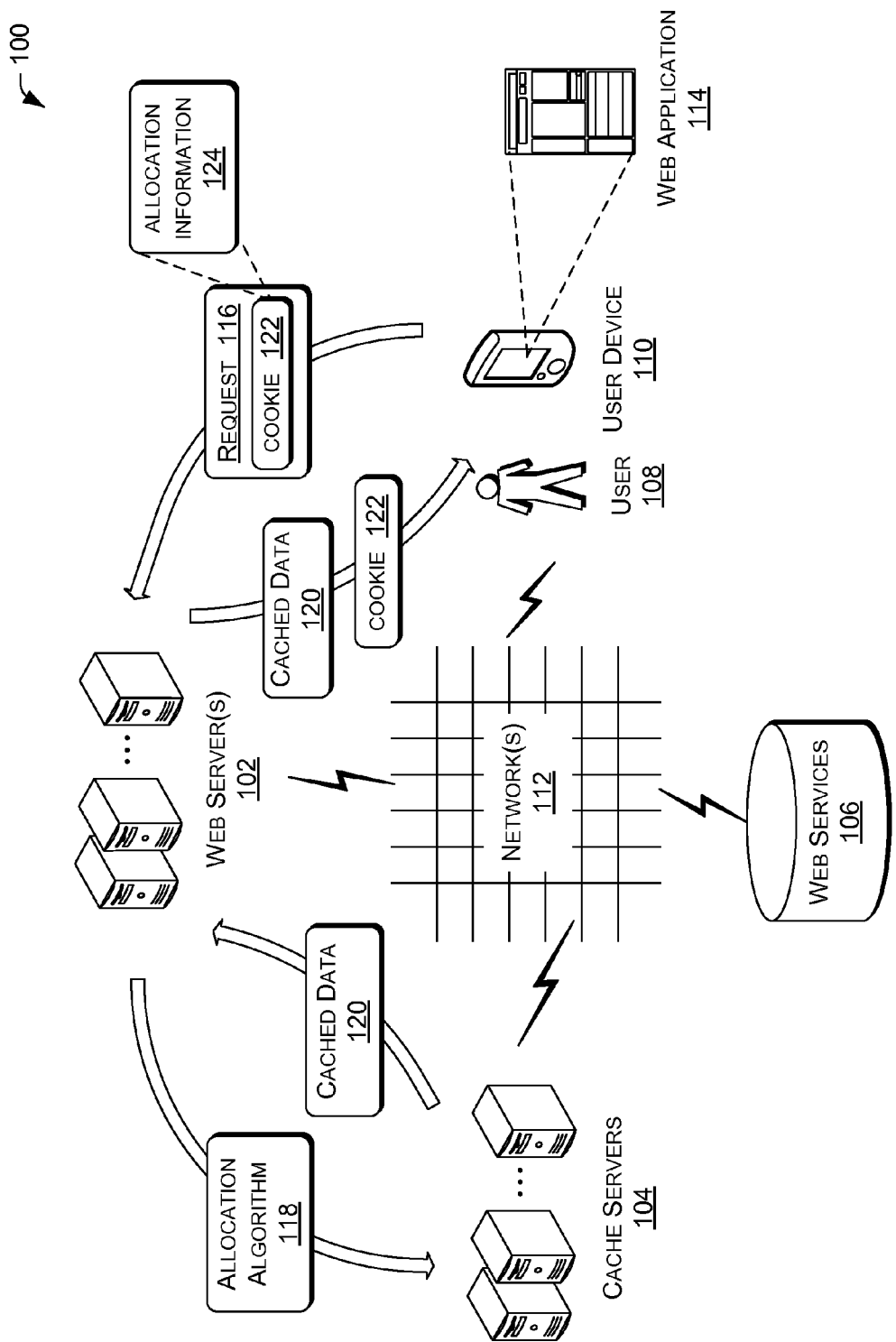
FIG. 1 is a block diagram of an illustrative environment that supports a distributed caching system.

FIG. 1 is a block diagram of an environment 100 that supports a distributed caching system. The environment 100 may include a Web server 102, cache servers 104, Web services 106, a user 108, a user device 110 and a network 112. The user 108 may run a Web application 114 for a certain Web service (e.g., a database service, a payment service or a Web search engine). The Web application 114 may, via the user device, in turn request certain data from the Web server 102. In some embodiments, the user device 110 may generate a request 116 and transmit the request 116 to the Web server 102. The Web server 102 may directly query and/or receive the certain data from the Web services 106.

In accordance with some embodiments, the Web server may store a portion or all of the requested data as cached data 120 on the cache servers 104 to promptly respond to data requests from the Web application 114. In these instances, the Web server 102 may provide an allocation algorithm 118 to instruct the cache servers to store the cached data 120, which is discussed in a greater detail in FIG. 2.

In some embodiments, in response to the request 116 from the user device 110, the Web server 102 may determine whether the requested data is cached in the Cache servers 104. If so, the Web server 102 may transmit the requested data to the user device 110. In some embodiments, the user device may receive the requested data from the cache servers 104.

In some embodiments, the Web server 102 may generate a cookie 122 and have the cookie 122 stored in the user device 110. The cookie 122 may include allocation information 124, which may indicate allocation of the cached data 120 in the cache servers 104. For example, the allocation information 124 may indicate specific one or more cache servers of the cache servers 104 that store the cached data 118.

In some embodiments, the request 116 may include the cookie 122. In these instances, the user device 110 may transmit the request 116 including the cookie 122 to the Web server 102. The Web server 102 may parse the request 116 to identify the cookie 122 and to obtain the allocation information 124. Based on the allocation information 124, the Web server may determine the specific one or more cache servers of the cache servers 104 and obtain the cached data 120.

Figure 2:
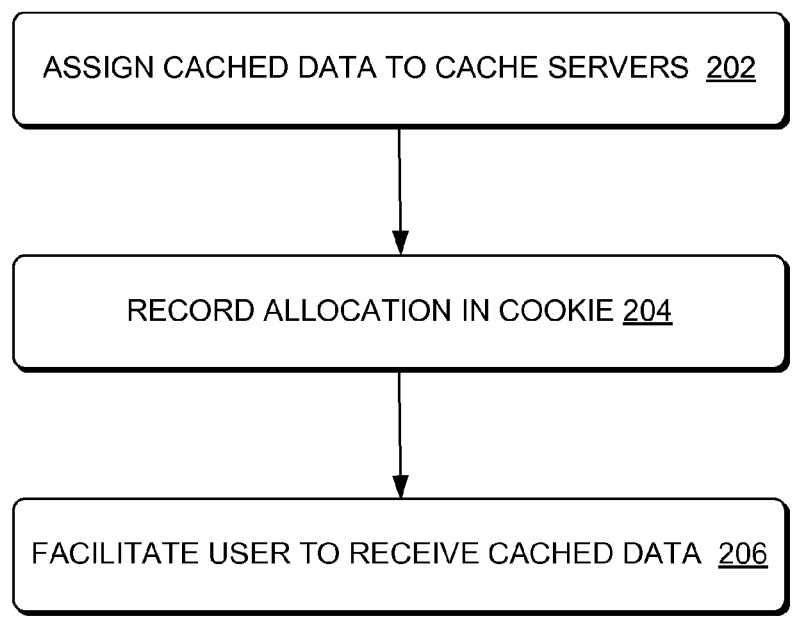
FIG. 2 is a flow diagram of a first illustrative process to facilitate a user to receive cached data using the distributed caching system of FIG. 1.

FIG. 2 is a flow diagram of an illustrative process 200 to enable a user to receive cached data using the distributed caching system of FIG. 1. At 202, the Web server 102 may assign the cached data 120 to the cache servers 104. In some embodiments, the Web server 102 may distribute the cached data 120 to the cache servers 104. In some embodiments, the Web server 102 may instruct the cache servers 104 to allocate the cached data 120 to one or more cache servers of the cache servers 104 by transmitting the allocation algorithm 118. For example, to allocate the cached data 120 of the user 108, the allocation algorithm 118 may include a hash(x) % N allocation method. A hash value may be calculated for the user 108, and therefore a corresponding cache server (e.g., hash(User 108) % N) may be assigned to the user 108. In some embodiments, a cache server may be randomly assigned by randomly generating a number. In these instances, the cached data 120 may to allocated to a corresponding cache server (e.g., random(User 108) % N).

At 204, the Web server 102 may record the allocation information 124 in the cookie 122, which is stored in the user device 110. In some embodiments, once the Web server stores and/or allocates the cached data 120 in the cache servers 104, the Web server may write the allocation information 124 for the cached data 120 to the cookie 122 (e.g., a user's client-side cookie). In these instances, the allocation information 124 may include the correlation between the cached data 120 and one or more cache servers that store the cached data 120.

For subsequent queries of the cached data 120, the allocation information 124 can be used to directly locate which cache server of the cache servers 104 stores the cached data 120. If there is more than one Web server 102, the server responsible for handling the user's current request may write the allocation information 124 for the cached data 120 to the cookie 122. For example, three cache servers, M1, M2 and M3 are deployed. If a particular piece of cached data for the user 108 is stored on M1, then the allocation information 124 in the cookie on User C's client will be recorded that the cached data is stored on M1.

Figure 3:
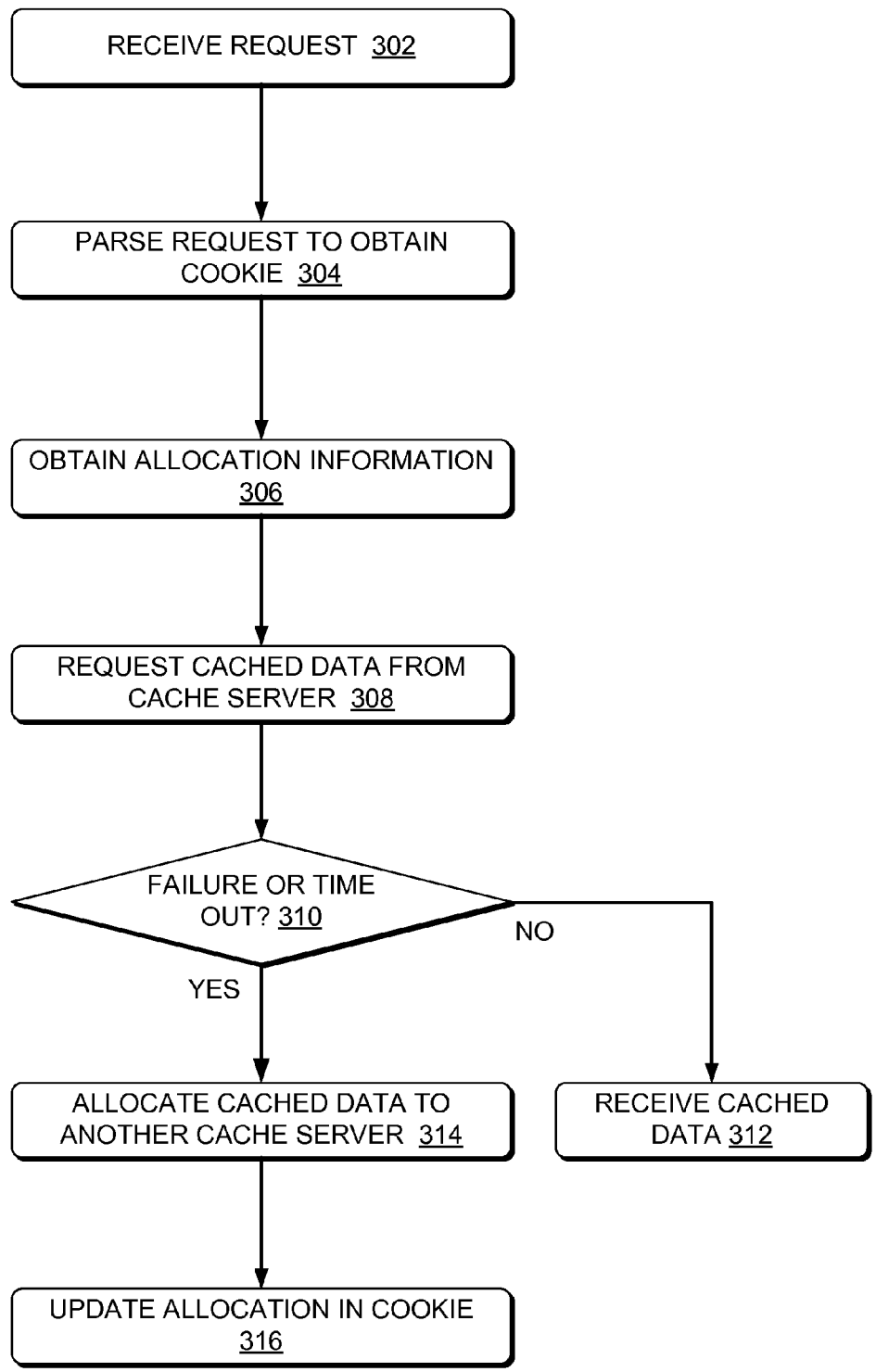
FIG. 3 is a flow diagram of a second illustrative process to request information from cache servers using the distributed caching system of FIG. 1.

At 206, the Web server 102 may facilitate the user 108 to receive the cached data 120 when the user device transmits another request for data associated with the cached data, which is discussed in a greater detail in FIG. 3. In some embodiments, the Web server 102 may retrieve the data based on the allocation information 124 stored in the cookie 122, and then transmit the data to the user device 110. In some embodiments, the Web server 102 may facilitate transmission of the data to the user device 110. In these instances, the user device may directly receive the data from the cache servers 104.

FIG. 3 is a flow diagram of an illustrative process 300 to request information from cache servers using the distributed caching system of FIG. 1. At 302, the Web server 102 may receive the request 116 from the user device 110. In some embodiments, the user device may transmit another request to another Web server before the Web server 102 receives the request 116. For example, the user 108's first request is received by the server W1, while the second request is received by the server W2.

At 304, the Web server 102 may parse the request 116 to obtain the cookie 122. Based on the cookie 122, the Web server 102 may identify and extract the allocation information at 306. When storing the cached data 120, the allocation information 124 has been recorded for the cached data 120 in the cookie 122. Accordingly, the allocation information 124 stored in the cookie 122 can be used to locate the corresponding cache server of the cache servers 104.

At 308, the Web server 102 may transmit a request to the cache servers 104 for the cached data 120. Upon receiving the cached data 120, the Web server may respond to the request 116, for example, transmitting the cached data 120 to the user device 110.

At 310, the Web server 102 may determine whether the cache servers 104 fail to respond to the request sent by the Web server 102 for the cached data 120. For example, the cache servers 103 may not respond if the corresponding cache server of the cache servers 104 is removed or malfunctions. In these instances, the cached data 120 stored in the failed server may not be available.

If the Web server 102 determines that the cache servers 104 properly respond to the request for the cached data 120 (i.e., the NO branch from 310), the Web server 102 may transmit the cached data 120 to the user device 110.

If the cache servers 104 fail to respond to the request for the cached data 120 (i.e., the YES branch from 310), the Web server 102 may, at 314, allocate the cached data 120 to another cache server of the cache servers 104. In these instances, the Web server 102 may determine that the cache servers 104 fail to respond if the Web server 102 does not receive a corresponding response from the cache servers 104 in a predetermined time period.

In some embodiments, the Web server 102 may assign the cached data 120 to the other server using methods similar to 202 of FIG. 2. In some embodiments, the other cache server may be randomly selected. For example, one of a group of functioning cache servers may be arbitrarily chosen. Alternatively the other cache server may be selected based on a predetermined sequence. At 316, the Web server may update the cookie 122 by rewriting the allocation information 124.

In some embodiments, once the reallocation information is written to the cookie 122, the Web server 102 may automatically overwrite the allocation information 124. Therefore, any readings after the overwriting may access the update allocation information 124, thus ensuring the accuracy of the allocation of the cached data 120. In these instances, when a cache server malfunctions or is removed, only cached data stored on this cache server will be affected, and normal operations of other cache servers will not be affected. Also, the stored cached data is reassigned to a different cache server, which is reflected in the overwritten allocation information 124, thus ensuring that information on the new cache server can take effect promptly and reducing the inconvenience caused by replacement of the cache server.

In addition, if it is necessary to add a new cache server, in accordance with some embodiments, new cached data may with equal probability be mapped to all the cache servers 104 including the newly added cache server. In these instances, the correspondence between the cached data 120 and the cache servers 104 may be directly written to the corresponding user cookie without necessitating a change to the original cache mapping, thus avoiding any impact to the original cache servers. The consistency of correspondence is maintained and there is no need to move any cached data.

The distributed caching method and caching parsing method of the present disclosure realize consistency of cache storage in a simple manner by utilizing the caching feature of cookies stored at the local client in HPPT protocol in writing allocation information to a user's client-side cookie. This reduces the impact on the original cached data when changes are made to the cache cluster. When adding a new cache server, the new allocation relationship can be directly written to the cookie 122 without impacting the original cached data; when a cache server is removed from the cluster, only the cached data on this cache server will be affected, and other cache servers are not affected. In some embodiments, the state-carrying distributed caching protocol of the present disclosure may be utilized in any internal C/S system with caching needs.

Suppose that a Web application corresponds to two Web servers W1 and W2, and to three memcache-based cache servers M1, M2 and M3. When a client C first submits a request, further suppose that the request is fielded by W1, which is then responsible for assigning the popular data of the client C to one of cache servers M1 to M3. Different approaches may be taken as needed: for example, generating a random number and assigning to the server random (C) % N; or computing a hash value for the client C, and assigning to the server hash (C) % N. The allocation information is then written by server W1 to the cookie of the client C. As a result, this cookie will accompany each follow-up request sent by the client C to the server, and this cookie is contained the cache information written by the server W1. For example, a particular request may be handled by server W2. The server W2 can immediately read from C's cookie that the corresponding cache server is M1, and thereafter request the necessary cached data from cache server M1.

If a cache server malfunctions or is removed from the cluster, should a Web server discover while handling a request from the client C that there is no response from the requested cache server, it will reselect a new cache server for the client C. Once this selection is successful, it will update the client C's cookie with the new allocation information. For example, when the client C requests cached data from cache server M1 via server W1, and M1 does not respond, server W1 selects cache server M2 according to a predetermined allocation policy, and stores cached data on M2. At the same time, it updates the allocation information on client C's cookie, so that when the client next sends a request, client C's cookie already contains the new allocation information. In this case, the effect on cached data is limited to that data cached on the cache server in question, and the allocation information in client C's cookie needs only to be updated once by any Web server to immediately take effect during the next access.

If business requires that the number of cache servers be expanded from N to N+1, then according to the aforementioned method, allocation of cached data can be performed according to the original allocation scheme, without affecting the original cache mapping. For example, the new cached data will be mapped to the N+1 servers on an equal probability basis.

Figure 4:
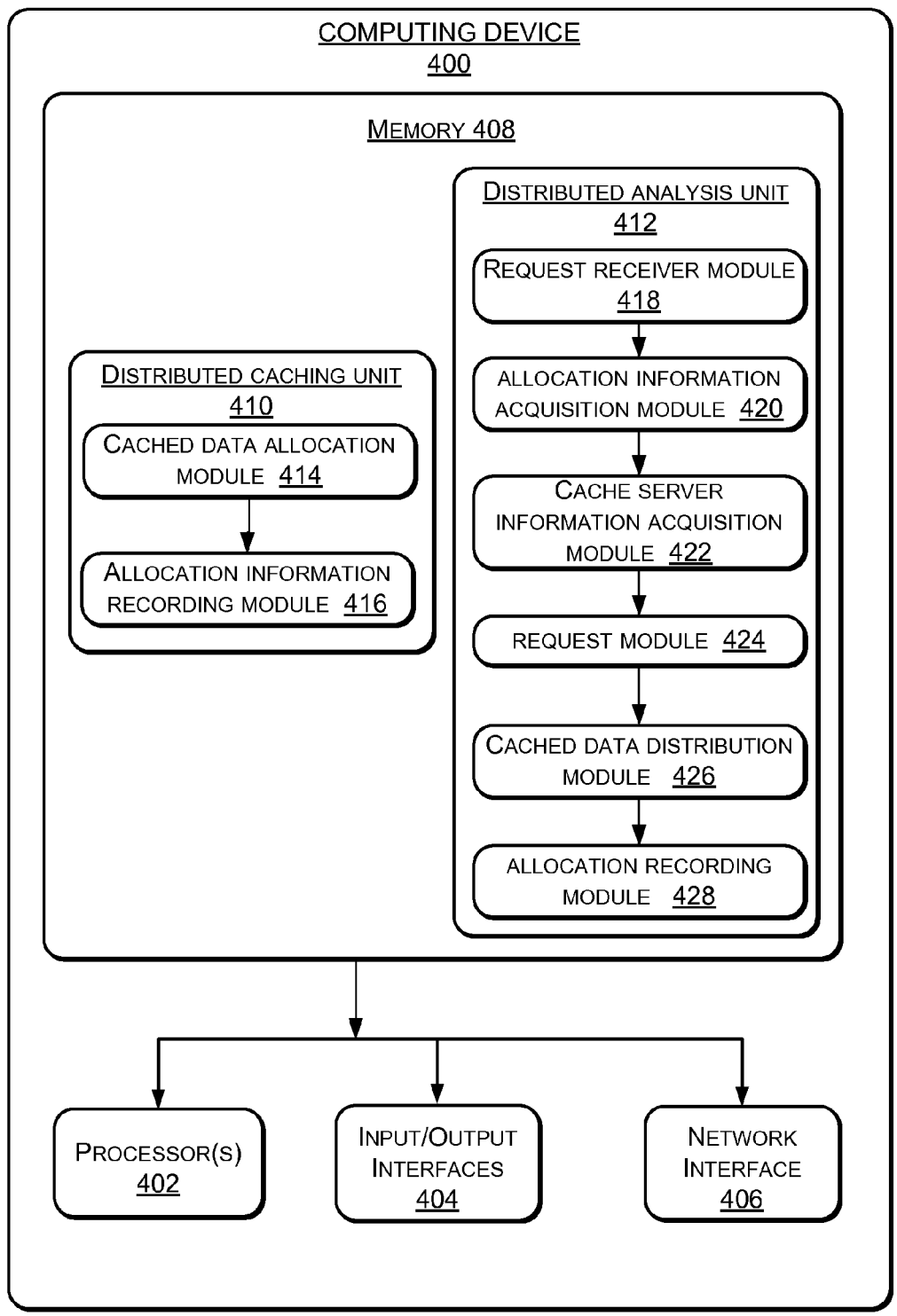
FIG. 4 is a block diagram of an illustrative computing device of various components included in the computing environment of FIG. 1.

FIG. 4 is a block diagram of an illustrative computing device 400, and of various components included in the computing environment of FIG. 1. The Web server 102 may be configured as any suitable server(s). In one exemplary configuration, the Web server 102 include one or more processors 402, input/output interfaces 404, network interface 406, and memory 408.

The memory 408 may include computer-readable media in the form of volatile memory, such as random-access memory (RAM) and/or non-volatile memory, such as read only memory (ROM) or flash RAM. The memory 408 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 408 in more detail, the memory 408 may store a distributed caching unit 410 and a distributed analysis unit 412. The distributed caching unit 410 may include a cached data allocation module 414 and an allocation information recording module 416. The distributed analysis unit 412 may include a request receiver module 418, an allocation information acquisition module 420, a cache server information acquisition module 422, a request module 424, a cached data distribution module 426 and an allocation recording module 428.

The cached data allocation module 414 may assign the cached data 120 to the cache servers 104 in response to the request 116 that is transmitted from the user device 110. The cached data allocation module 414 may assign the cached data randomly or based on a predetermined hash value or a predetermined hash method. The allocation information recording module 416 may write the allocation information 124 in the cookie 122. In some embodiments, the allocation information writer module 416 may write the allocation relationship and other information concerning the cached data 120 and the cache servers 104 to the user's corresponding cookie (e.g., the cookie 122) based on information obtained from cached data allocation module 414.

The request receiver module 418 may receive the request 116 from the user device 110. The allocation information acquisition module 420 may identify and/or acquire the allocation information 124 for the cached data 120 in response to the request 116. The cache server information acquisition module 422 may determine one or more cache servers of the cache servers 104 corresponding to the cached data 120 based on the acquired allocation information 124.

The request module 424 may transmit a request to the one or more identified cache server of the cache servers 104 for the cached data. The cached data distribution module 426 may assign the cached data 120 to another cache server of the cache servers 104 in the event that there is no response from the cache servers 104 to the request, for example in a predetermined time period. The allocation recording module 428 may then update the cookie 122 by overwriting the allocation information 124.

The various embodiments of the present specification are described in a progressive manner. The focus of the description of each embodiment is their difference from other embodiments; those parts which are the same or similar can be ascertained by reference to both descriptions.

The foregoing describes in detail the distributed caching method and system, and parsing method and system for caching provided by the present application, the specific examples herein are utilized to illustrate the principles and embodiments of the application. The description of the embodiments above is designed to assist in understanding the method and core ideas of the present disclosure; persons skilled in the art could, based on the ideas in the application, make alterations to the specific embodiments and application scope, and thus the content of the present specification should not be construed as placing limitations on the present application.

What is claimed is:

1. One or more non-transitory computer-readable media storing computer-executable instructions that, when executed by one or more processors, configure the one or more processors to perform acts comprising:

receiving, from a user device, a request for data associated with a Web service;

allocating at least one portion of the data associated with the Web service to multiple cache servers;

recording allocation information in a cookie that is designated to the user device, the allocation information indicating a relationship between the at least one portion of the data and the one or more cache servers;

receiving, from the user device, another request for data related to the at least one portion of the data, the other request including the cookie;

identifying the cookie to obtain the allocation information;

facilitating transmission of the at least one portion of the data to the user device based on the allocation information;

requesting the at least one portion of the data from the multiple cache servers;

determining that a cache server of the multiple cache servers fails, within a predetermined time period, to respond to the request for the at least one portion of the data; and reallocating, in response to the determination that the cache server of the multiple cache servers fails, the at least one portion of the data to another cache server of the multiple cache servers.

2. The one or more non-transitory computer-readable media of claim 1, wherein the acts further comprise:

updating the allocation information in the cookie to reflect the reallocating.

3. The one or more non-transitory computer-readable media of claim 1, wherein the reallocating the at least one portion of the data to the other cache server comprises reallocating the at least one portion of the data to the other cache server based on a predetermined order of multiple cache servers.

4. The one or more non-transitory computer-readable media of claim 1, wherein the one or more cache servers include multiple cache servers, and the acts further comprise:

determining that the multiple cache servers add or remove a cache server;

reallocating the at least one portion of the data to the multiple cache servers based on a predetermined rule; and updating the allocation information in the cookie to reflect the reallocating.

5. The one or more non-transitory computer-readable media of claim 1, wherein the acts further comprise:

requesting, from a service provider server, the data;

receiving the data from the service provider; and identifying the at least one portion of the data from the data received from the service provider server.

6. The one or more non-transitory computer-readable media of claim 1, wherein the one or more cache servers comprise memcached-type servers.

7. The one or more non-transitory computer-readable media of claim 1, wherein the allocating the at least one portion of the data comprises allocating the at least one portion of the data based on a HASH rule.

8. The one or more non-transitory computer-readable media of claim 1, wherein the Web service comprises at least one of a database service, a payment service, and a Web search engine.

9. A computer-implemented method, performed via one or more processors having instructions of the method comprising:

receiving, from a user device, a request for a Web service;

parsing the request to identify a cookie having allocation information indicating that multiple cache servers temporarily store at least one portion of data associated with the Web service;

requesting, from the multiple cache servers, the at least one portion of the data based on the allocation information, transmitting the requested at least one portion of the data to the user device;

requesting the at least one portion of the data from the multiple cache servers;

determining that a cache server of the multiple cache servers fails, within a predetermined time period, to respond to the request for the at least one portion of the data; and reallocating, in response to the determination that the cache server of the multiple cache servers fails, the at least one portion of the data to another cache server of the multiple cache servers.

10. The method of claim 9, further comprising:

determining that the cookie does not have allocation information;

requesting, from a Web service server, particular data associated with the Web service; and recording allocation information in the cookie designated to the user device.

11. The method of claim 10, wherein the allocating the particular data to the multiple cache servers comprises allocating the particular data to the multiple cache servers based on a predetermined order of multiple cache servers.

12. The method of claim 10, wherein the allocating the particular data comprise allocating the particular data based on a HASH rule.

13. The method of claim 9, further comprising:

determining that a cache server of the one or more cache servers fails to provide the requested the at least one portion of the data, the one or more cache severs including multiple cache servers;

requesting the at least one portion of the data from a Web service server;

reallocating the at least one portion of the data to another cache server of the multiple cache servers; and updating the allocation information in the cookie to reflect the reallocating.

14. The method of claim 9, further comprising:

determining that the one or more cache servers add or delete a cache server, the one or more servers including the multiple cache severs;

reallocating the at least one portion of the data to the multiple cache servers based on a predetermined rule; and updating the allocation information in the cookie to reflect the reallocating.

15. The method of claim 9, wherein the one or more cache servers comprise memcached-type servers.

16. One or more non-transitory computer-readable media storing computer-executable instructions that, when executed by one or more processors, configure the one or more processors to perform acts comprising:

receiving, from a user device, a request for a Web service;

parsing the request to determine a cookie designated to the user device;

determining whether the cookie has allocation information indicating allocation of data associated with the Web service among multiple cache servers;

requesting the data associated with the Web service from the multiple cache servers;

determining that a cache server of the multiple cache servers fails to respond to the requesting within a predetermined time period; and reallocating, in response to the determination that the cache server of the multiple cache servers fails, the data associated with the Web service to another cache server of the multiple cache servers, wherein, in the event that the cookie has the allocation information:

determining the data associated with the Web service based on the allocation information, and facilitating transmission of the data associated with the Web service to the user device, and wherein, in the event that the cookie does not have the allocation information:

receiving the data associated with the Web service from a Web service server, allocating the data associated with the Web service to the multiple cache servers, and recording the allocation information in the cookie.

17. The one or more non-transitory computer-readable media of claim 16, wherein the acts further comprise:
- determining that there is no cookie included in the request; and
- creating the cookie.

18. The one or more non-transitory computer-readable media of claim 16, wherein the acts further comprise:
- updating the allocation information in the cookie to reflect the reallocating.

19. The one or more non-transitory computer-readable media of claim 16, wherein the acts further comprise:
- determining that the multiple cache servers add or delete a cache server;
- reallocating the data associated with the Web service to the multiple cache servers based on a predetermined rule; and
- updating the allocation information in the cookie to reflect the reallocating.

20. The one or more non-transitory computer-readable media of claim 16, wherein the multiple cache servers comprise memcached-type servers.

\* \* \* \* \*